(No Model.)
J. W. WOFFORD.
FEEDER FOR COTTON GINS.
No. 421,037. Patented Feb. 11, 1890.
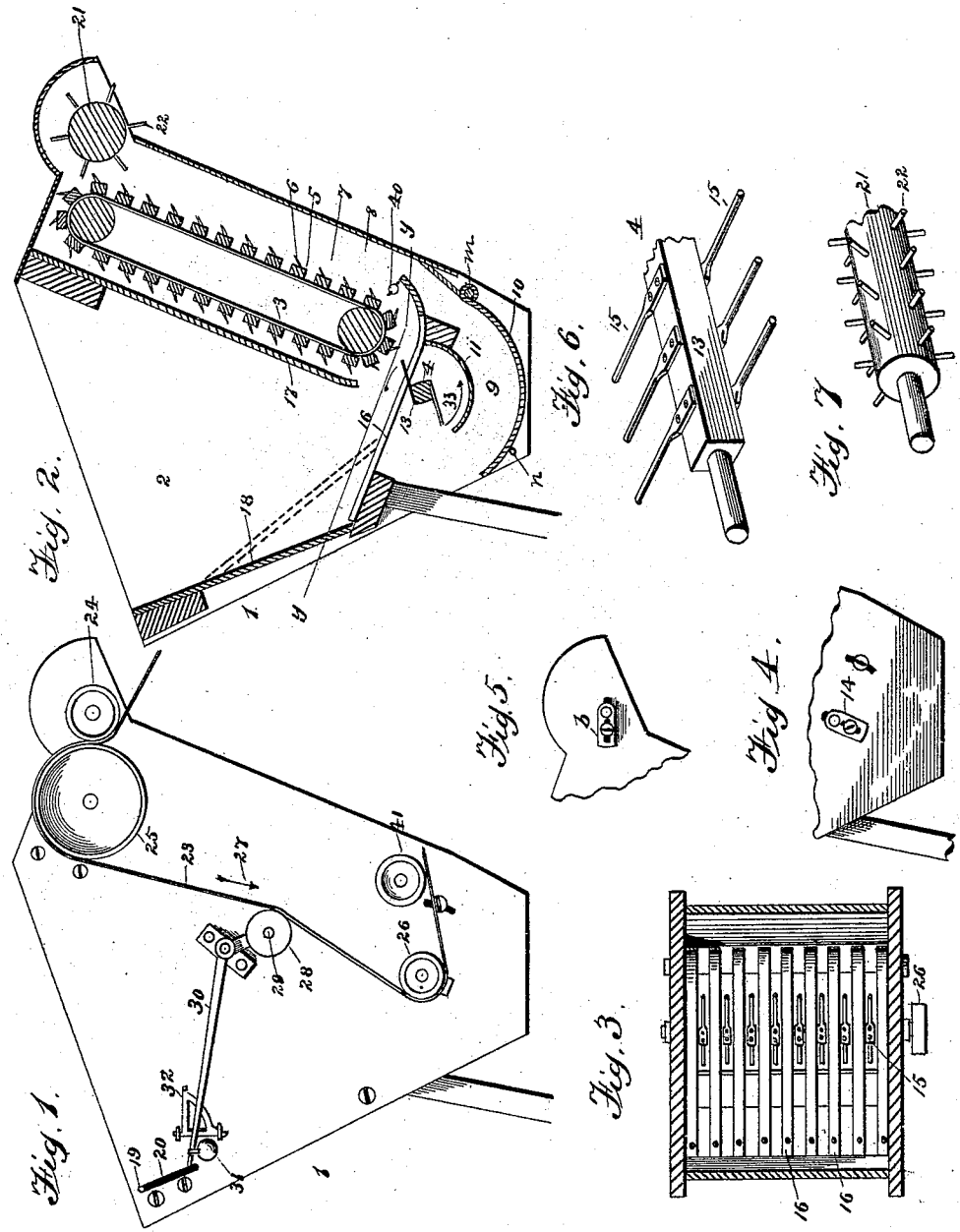
Witnesses
Thomas Durant
Alex J. Stewart
Inventor
John W. Wofford
By his Attorney
W. H. H. Knight

UNITED STATES PATENT OFFICE.

JOHN W. WOFFORD, OF SPARTANBURG, SOUTH CAROLINA.

FEEDER FOR COTTON-GINS.

SPECIFICATION forming part of Letters Patent No. 421,037, dated February 11, 1890.

Application filed March 7, 1889. Serial No. 302,244. (No model.)

*To all whom it may concern:*

Be it known that I, JOHN W. WOFFORD, a citizen of the United States, residing at Spartanburg, in the county of Spartanburg and State of South Carolina, have invented certain new and useful Improvements in Feeders for Cotton-Gins; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in feed devices for cotton-gin machinery; and it consists, essentially, in the construction, arrangement, and combination of the several parts comprised therein for service, substantially as is hereinafter set forth, and illustrated in the accompanying drawings, wherein similar figures of reference denote similar parts.

In said drawings, Figure 1 represents in side elevation a cotton-gin feeder constructed and operating in accordance with my invention. Fig. 2 is a vertical longitudinal section thereof. Fig. 3 is a horizontal sectional view thereof, taken on the line $y\ y$ of Fig. 2. Figs. 4 and 5 are detached detail views showing the adjustable bearings or boxes wherein parts of the operating mechanism are mounted. Fig. 6 is a perspective view illustrating a portion of the feed-regulator, and Fig. 7 is a similar view illustrating a portion of the discharging-roll of the feed-carrier.

It is a fact well known to those familiar with the art to which my invention appertains that cotton when brought from the field and before being ginned usually contains a greater or less amount of foreign substances—as, for instance, sticks, stones, pieces of bone, clods of earth, nails, &c.—the presence of which is largely due to carelessness upon the part of the pickers, who for the most part are children or negroes. It is also well known that the major portion of the foreign substances so contained in the cotton are, when said cotton is being ginned, carried through the cotton-feeding devices as at present constructed and are discharged with said cotton into the breast of the gin, in which position they endanger the saws of the gin to a greater or less degree, according to their character.

Having in view the facts above set forth, I have invented a cotton-feeding device for ginning machinery whereby any and all foreign substances contained in the cotton when placed in the hopper are removed therefrom during its passage to the gin proper.

In carrying out my invention I provide an inclosing-case 1, which may be of any desired configuration of outline, with a hopper 2 for the reception of the material to be ginned, a carrier 3, to convey said material to the breast or throat of the gin, and a feed-regulator 4, to limit and control the quantity of material conveyed by the carrier 3.

While so far as described the parts named are common to each and every device of the class in use, I yet in my invention so arrange the said parts as to attain a result not attained as yet in machines of this class—viz., the complete separation of foreign substances from the cotton while the latter is in transit to the gin, which result I accomplish mainly by moving the carrier in a direction opposite to that in which the carrier of feed devices in common use are moved, whereby the material is carried forward to the gin by the under surface of the carrier, instead of by the upper surface, as is the common method. I provide the slats 5 of the carrier with a series of short teeth 6, which project from the under surface of the carrier in a plane slightly above the horizontal (see Fig. 2) and move within a chute 7, formed by the carrier upon the one side and the front 8 of the inclosing-case 1 upon the other, as shown. The chute 7 opens at its bottom into a trash-box 9, the bottom 10 of which is hinged at $m$, to swing downward to discharge the contents of said box. A removable stud or pin $n$, projecting from the inner surface, holds the bottom 10 in normal position. (See Fig. 2.)

Immediately below the carrier 3, and separated from the trash-box 9 by a partition 11, I arrange a rotating feed-regulator 4, which comprises a central shaft 13, preferably square in cross-section and journaled in adjustable boxes 14, each of which consists of a metal plate having at one end an aperture to receive the end of the shaft and at the other a slot through which a screw or bolt passes into the sides of the inclosing-case 1, and has secured thereto a series of projecting fingers 15, that project between the bars 16 of a grate, which forms the bottom of the hopper 2, and extend into or nearly into contact with the carrier 3. As before stated, the feed-regulator 4 is mounted in adjustable boxes, and hence said regulator may be adjusted nearer to or farther from the carrier to control the amount of cotton passing from the hopper 2 to said carrier, as will be readily understood.

I separate the carrier 3 from the hopper 2 by a partition 17, so that the material within said hopper shall not bear upon said carrier, and thereby operate to clog its action.

I provide that the capacity of the hopper may be contracted by forming the near side thereof of a swinging flap 18, the lower edge of which normally rests behind, and is held from movement by the rear ends of the grate-bars 16, (see Fig. 2,) but which may be raised from said locked position and permitted to assume the angle shown by dotted lines in said Fig. 2 for the purpose of contracting the lower end of the hopper 2. The flap 18 may be movably secured to the sides of the case 1 in various ways, one of which consists in providing said flap at its upper side corners with projecting pins 19, that extend outward through slots 20, formed in the sides of the case. (See Fig 1.)

The cotton is removed from the carrier 3 by a revolving drum 21, mounted in boxes, which consist of plates apertured at one end to receive the shaft and slotted at the other to receive securing screws or bolts that pass into the sides of the inclosing-case, and provided with projecting teeth 22.

I operate the various parts of my improved feeder through the medium of a single belt 23, which passes from the gin proper below and in contact with a pulley 24 upon the shaft of the drum 21, thence over a pulley 25 upon the shaft of the upper carrier-roll, thence about a pulley 26 upon the shaft of the feed-regulator, and thence to the gin proper, the said belt moving in the direction indicated by the arrow 27.

I impart tension to the belt 23 by an idle-pulley 28, mounted upon a spindle 29, projecting from one end of a lever 30, fulcrumed to the case 1, and provided at its free end with a weight 31.

A swinging bracket 32 is arranged to receive the lever 30 when it is desirable to remove tension from the belt 23 for the purpose of stopping the action of the feeder.

To prevent, further, as far as possible the passage of foreign substances to the under surface of the feeder, as well as to beat back loose locks of cotton that might chance to pass the regulator 4, a second or supplemental regulator 40, comprising a small rotating roll having projecting flanges or wings, may be arranged at or near the bottom of the carrier 3, at the under surface thereof, (see Fig. 2,) and said regulator 40 may be actuated by the belt 23 through the medium of pulley 41 upon its shaft. (See Fig. 1.)

It will be readily apparent that the supplemental roller 40 will not only act to beat backward loose locks of cotton, which by being entangled with the cotton upon the carrier-teeth may be dragged past the regulator 4, but will also act to prevent in great measure the passage of foreign substances to the under surface of the carrier.

The operation of my improved feeder is as follows: Presuming the various parts to be properly adjusted and the belt 23 under tension, cotton is placed in the hopper 2 and thence passes below the partition 17 to the carrier and is engaged by the teeth 6 thereof, and a portion of said cotton, determined by the regulators 4 and 40, is carried forward to the gin. It will be apparent that the excess of material beyond a desired quantity, together with large articles of foreign substances, will be beaten backward by the action of the regulator 4, the fingers 15 of which move in the direction indicated by the arrow 33, while such foreign substances as may pass said regulator will fall from the carrier 3 into the chute 7, and thence pass into the trash-box 9, from which they may be readily removed.

It will be apparent that the teeth of the carrier are made of a length sufficient to take into and retain the "cotton-locks" alone; hence substances other than said cotton-locks must of necessity pass by gravity into the chute 7 and thence to the trash-box 9.

Having thus described my invention, I claim and desire to secure by Letters Patent—

1. A feeder for cotton-gins, comprising an inclosing-case, a carrier within said case, constructed and arranged, as described, to convey material upon its under surface, a chute open at one side to said carrier, and a trash-box communicating with said chute, substantially as described.

2. A feeder for cotton-gins, comprising an inclosing-case, a hopper within said case, a carrier arranged to take material from said hopper and constructed to convey material upon its under surface, a feed-regulator to control the supply of material to said carrier, a chute formed by the carrier on one side and front of the inclosing-case upon the other side for foreign substances, and a trash-box communicating with said chute, substantially as described.

3. The combination, in a feeder for cotton-gins, of a carrier constructed to convey material upon its under surface with a regulator to control the quantity of material carried by said carrier, a chute formed of the carrier upon one side and front of the inclosing-case upon the other side for foreign substances, a trash-box communicating with said chute, and a rotating drum having teeth to deliver the material from the carrier to the gin, substantially as described.

4. A feeder for cotton-gins, comprising the combination of a hopper, a carrier constructed to convey material upon its under surface from said hopper to the gin, a regulator to control the quantity of material carried by said carrier, a chute formed by said carrier on the one side and front of the inclosing-case on the other, and a trash-box communicating with said chute, with a supplemental regulator arranged in juxtaposition to said carrier, substantially as described.

In testimony whereof I affix my signature in presence of two witnesses.

JOHN W. WOFFORD.

Witnesses:
   THOMAS M. NESBITT,
   JAMES A. FOSTER.